May 10, 1932.  T. F. BRACKETT  1,857,124
FRICTION BRAKE
Filed Oct. 19, 1928
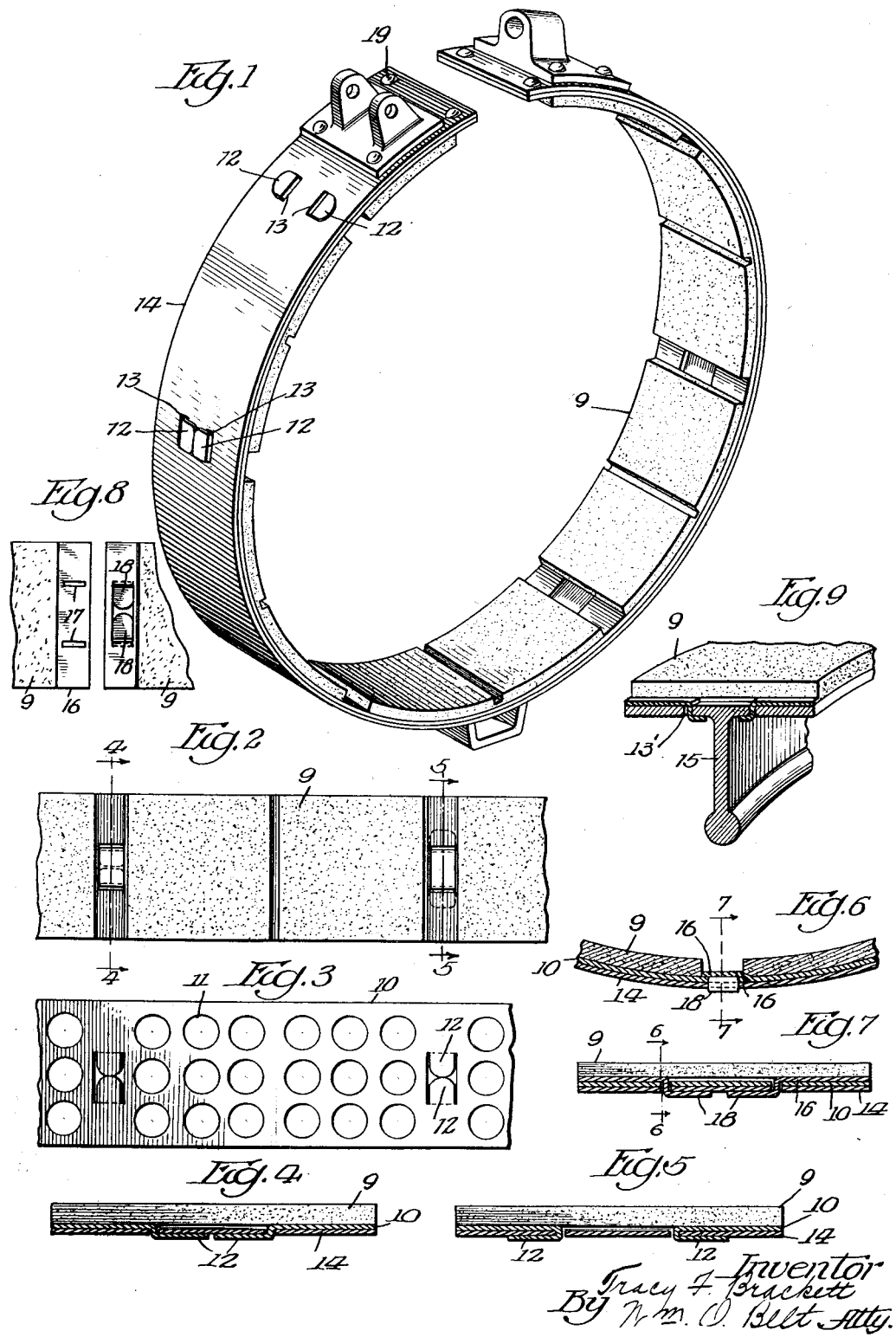

Patented May 10, 1932

1,857,124

UNITED STATES PATENT OFFICE

TRACY F. BRACKETT, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed October 19, 1928. Serial No. 313,508.

This invention relates to friction brakes and more particularly to means for fastening a friction block to the brake band of an external brake or to the shoe or head of an internal brake.

The primary object of the invention is to provide simple means for easily and quickly and securely fastening a brake block in a single unit or in strip form to a band or shoe or head or other support.

In the accompanying drawings I have shown the invention in simple embodiments satisfactory for the purposes intended and referring thereto:

Fig. 1 is a perspective view of a brake band having the invention applied thereto.

Fig. 2 is a plan view looking at the wearing face of the brake assembly embodying the invention.

Fig. 3 is a plan view of a strip back before the tongues are bent.

Figs. 4 and 5 are transverse sectional views on the line 4—4 and the line 5—5 of Fig. 2.

Fig. 6 is a sectional view on the line 6—6 of Fig. 7.

Fig. 7 is a sectional view on the line 7—7 of Fig. 6.

Fig. 8 illustrates the ends of two unit blocks which are overlapped in fastening them in place.

Fig. 9 is a sectional view showing the application of the invention to a shoe or head.

Referring to the drawings 9 is the body of a block and 10 is the strip form of metal back made in a continuous length and provided with a series of openings 11 at intervals with the body material molded or otherwise applied thereto and embedded in the openings. Each body and that part of the strip immediately associated therewith constitutes, in effect, a block; and a continuous metal strip having a plurality of bodies theron at intervals constitutes a convenient form of providing and using a number of blocks. The bodies are spaced apart on the strip and between the bodies the strip has tongues 12 stamped therefrom to engage openings 13 arranged in pairs in the band 14, or 13' in the shoe or head 15. When first stamped the tongues are directed towards each other with their free ends adjacent, Fig. 3, and the openings 13 and 13' of each pair are similarly spaced apart. The tongues may remain unbent as shown in Fig. 3 until the time comes for fastening a block to a support and then the tongues are bent laterally to engage the openings in the support, after which the tongues are clenched down upon the support. In clenching the tongues I prefer to bend the ends of one pair outward and of the next pair inward, and alternate the bending in this way as indicated in Fig. 1, as a desirable manner of fastening the blocks on the support. When unit blocks are used the back projects beyond the body at each end, as indicated at 16, Fig. 8, and one projecting end is provided with slot openings 17 and the other projecting end has tongues 18. In Fig. 8 I have shown the slotted end of one unit block and the tongued end of another unit block and when these blocks are fastened to a support the tongues 18 are first engaged with the slot opening 17 and then with the slot openings in the support as heretofore described. Both ends of each unit may be tongued if desired, in which case the tongues of one block may be bent upon its back, or removed entirely, to accommodate the tongues of another block. A brake band may be provided with slots 13 at its ends to receive tongues 12, or the ends of the blocks at the ends of the band may be left free, but I prefer to fasten the ends of the blocks at the ends of the band by the means heretofore described or by rivets 19 or by spot welding.

I am aware that changes in the form of construction and arrangement of parts of my invention may be necessary or desirable to satisfy different conditions and I reserve the right to make all such changes as fairly fall within the scope of the following claims:

I claim:

1. The combination of a support having a plurality of openings therein arranged in pairs spaced apart and inwardly from the marginal edges thereof, and a friction block comprising a metal back and a body mounted on the back, the back extending beyond the ends of the body, and tongues stamped from the back within the marginal edges thereof at the ends of the body projected through said openings in the support, the ends of one pair of tongues being bent outward and clenched on the support and the ends of the other pair of tongues being bent inward and clenched upon the support.

2. The combination of a support having enclosed slots arranged in pairs, the slots in each pair being spaced transversely of the support and the pairs of slots being spaced longitudinally of the support, and a friction block mounted on one side of said support and having transversely extending tongues bent through said slots and clenched upon the other side of said support, whereby the thrust of the blocks under braking pressure is transmitted transversely of the tongues against the ends of the slots.

TRACY F. BRACKETT.